United States Patent [19]

Yanagiako et al.

[11] 4,368,060

[45] Jan. 11, 1983

[54] GAS SPARGING METHOD

[75] Inventors: Hiroshi Yanagiako; Toshio Kanai, both of Yokohama; Yoshio Kogawa, Fujisawa; Michihiro Yoshida, Kawasaki; Zenji Mashino, Soka; Shin-ichi Shimizu; Teruo Sugiya, both of Kawasaki; Masaki Onozaki, Yokohama, all of Japan

[73] Assignee: Chiyoda Chemical Engineering & Construction Co., Ltd., Yokohama, Japan

[21] Appl. No.: 287,114

[22] Filed: Jul. 27, 1981

Related U.S. Application Data

[63] Continuation of Ser. No. 131,369, Mar. 18, 1980, abandoned, which is a continuation-in-part of Ser. No. 937,746, Aug. 29, 1978, abandoned.

[30] Foreign Application Priority Data

Aug. 29, 1977 [JP] Japan .................. 52-102635
Oct. 19, 1977 [JP] Japan .................. 52-124598

[51] Int. Cl.³ .............................................. B01F 3/04
[52] U.S. Cl. .......................................... 55/73; 55/95; 261/124; 422/168
[58] Field of Search ................... 261/121 R, 122, 123, 261/124, DIG. 9; 210/220, 221 R, 221 P; 55/73, 95; 422/168

[56] References Cited

U.S. PATENT DOCUMENTS

| | | | |
|---|---|---|---|
| 889,694 | 6/1908 | Lambert | 261/123 |
| 2,064,833 | 12/1936 | Howard | 261/121 R |
| 2,341,246 | 2/1944 | Stowe | 261/124 |
| 2,721,065 | 10/1955 | Ingram | 261/124 |
| 2,820,620 | 1/1958 | Anderson | 261/124 |
| 3,064,956 | 11/1962 | Reed | 261/124 |
| 3,162,702 | 12/1964 | Yonner | 210/220 |
| 3,608,834 | 9/1971 | MacLaren | 261/124 |
| 3,635,453 | 1/1972 | Caldwell | 261/124 |
| 3,658,304 | 4/1972 | Hall, Jr. et al. | 261/124 |
| 4,229,417 | 10/1980 | Kangi et al. | 261/124 |
| 4,301,128 | 11/1981 | Hastrup | 55/73 |

FOREIGN PATENT DOCUMENTS 813995 9/1951 Fed. Rep. of Germany ...... 261/124

Primary Examiner—Tim R. Miles
Attorney, Agent, or Firm—Armstrong, Nikaido, Marmelstein & Kubovcik

[57] ABSTRACT

This invention is directed to a sparging method wherein efficient gas-liquid contact is obtained without causing sloshing by introducing and dispensing gas into the liquid only through openings in the side wall of a specially designed sparger which has a single row of openings in its side wall around the periphery thereof and an open end, the gas being introduced at a rate such that the distance l between the openings in the side wall and the liquid level on the gas introduction side is within a range represented by the formula:

$$10 \text{ mm} < l < (L-10) \text{ mm}$$

wherein L stands for the distance, which is at least 50 mm, between the openings in the side wall of the sparger and the open bottom.

11 Claims, 24 Drawing Figures

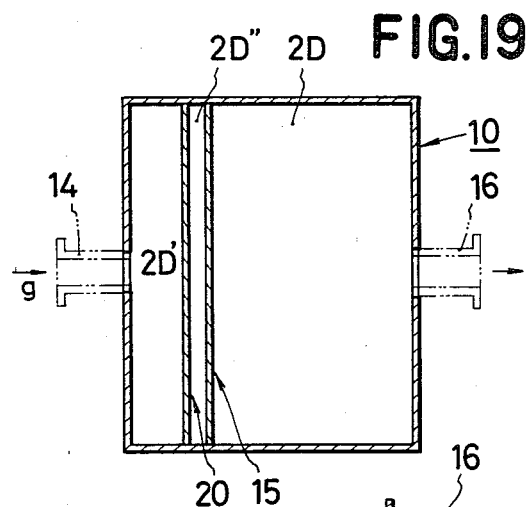
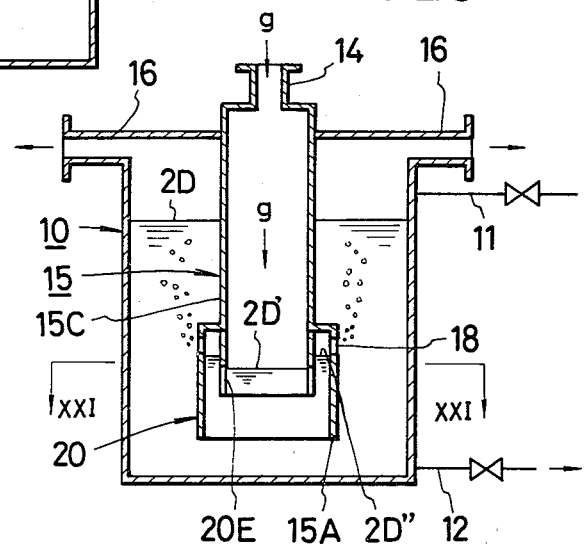
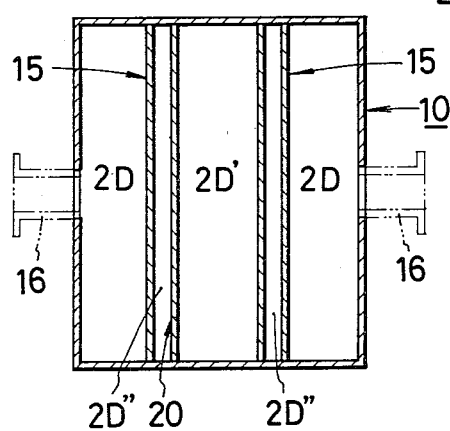

GAS SPARGING METHOD

CROSS REFERENCE TO RELATED APPLICATIONS

This is a continuation of application Ser. No. 131,369, filed Mar. 18, 1980 and now abandoned, which is a continuation-in-part of application Ser. No. 937,746, filed Aug. 29, 1978 and now abandoned.

BACKGROUND OF THE INVENTION

1. Field of the Invention

The present invention relates to a gas sparging method for absorbing a component of a gas in a liquid or for effecting a gas-liquid reaction by gas-liquid contact.

2. Description of the Prior Art

There is known a bubbling tower in which a gas is introduced into a liquid and the gas is dispersed in the liquid in the form of fine bubbles to increase the gas-liquid contact interface area. Such tower has a gas sparger for dispersing the gas into the liquid.

As such gas sparger, there are ordinarily adopted: (1) a sparger composed of a porous material such as a sintered metal, or (2) a sparger comprising a perforated plate or a perforated pipe having the ends blocked.

A sparger of the first type composed of a sintered metal or other porous material is advantageous in that fine bubbles can be generated and the contact area can be increased, but this sparger is defective in that the treatment capacity is small, the pressure loss is extreme and clogging or jamming readily occurs.

A sparger of the second type comprising a perforated plate is broadly used, but since it is dipped in the liquid, the gas must pass through the liquid before it is dispersed, and there is inevitably brought about a disadvantage because resistance to gas introduction is very large. Further, with increase of the quantity of the gas being treated, there is caused a so-called sloshing phenomenon in which the liquid containing gas bubbles repeats a large horizontal movement periodically.

This sloshing phenomenon of the liquid 2 in a bubbling tower 1 will now be described conceptually by reference to FIGS. 1-A, 1-B, 2-A and 2-B. The liquid level 2A inclined with respect to the horizontal direction is changed from the state shown in FIG. 1-A to the state shown in FIG. 1-B. Further, the concave liquid face 2B shown in FIG. 2-A is changed to the convex liquid face 2C shown in FIG. 2-B. In practice, changes of the liquid level are more complicated. If such changes of the liquid level are extreme, the gas-liquid contact time is varied according to the gas-jetting position and the gas-liquid contact efficiency is reduced. Further, because of extreme changes of the liquid level, it becomes difficult or impossible to operate the apparatus stably. If it is intended to conduct the operation stably, the quantity of the gas to be introduced should be controlled at a low level and it becomes impossible to fully utilize the treating capacity of the gas-liquid contact apparatus. Still further, the apparatus per se should be designed and constructed so that it can resist most violent changes of the liquid level or most violent sloshing phenomenon without any trouble or difficulty or disorder in the apparatus.

A gas sparger of the porous pipe type comprises an end-blocked linear or ring-like pipe having a great number of small holes formed on the top or bottom or the side face. When such sparger is used, it is maintained in the horizontal state and the gas is spouted out from said small holes. Also this porous pipe sparger includes a region where sloshing is caused with increase of the amount of the gas being treated as in case of the above-mentioned porous plate sparger. If the liquid is a slurry containing solids suspended therein, when introduction of the gas is stopped, the slurry intrudes into the pipe through the small holes and the solids in the slurry adhere to the pipe wall to form scales. When the operation is started again, such scales of the solids do not flow out completely, thereby causing the pipe to become clogged with the solids.

Accordingly, there has been a need for the elimination of the foregoing defects and disadvantages in known gas spargers.

SUMMARY OF THE INVENTION

It is a primary object of the present invention to provide a gas sparging method for gas-liquid contact in which the gas-liquid contact area can be increased with reduced changes of the liquid level, the capacity of the gas-liquid contact treatment can be increased, the pressure loss in the gas can be remarkably reduced, occurrence of such trouble as clogging and adhesion of scale can be prevented in the gas sparging means, resistance to gas introduction can be remarkably diminished, and the operation can be conducted stably for a long time at a high gas-liquid contact efficiency.

This and other objects of the present invention can be attained by a gas sparging method comprising (a) dipping a tubular member having an open bottom end and a single row of openings in the side wall thereof into a liquid in a vessel, the openings in the side wall of the tubular member being at a distance from the open bottom end such that said openings are located below the liquid level, and (b) introducing a gas through said tubular member to bring down the level of the liquid in the tubular member to a position below the openings in the side wall but above the open bottom end or (b') introducing the gas into the vessel so as to bring down the level of the liquid outside the tubular member to a position below the openings in the side wall of the tubular member but above the open bottom end thereof, whereby the gas is dispersed into the liquid only through said single row of openings in the side wall of the tubular member.

BRIEF DESCRIPTION OF THE DRAWINGS

FIGS. 14, 15, 17, 18 and 20 are partially cut-out longitudinally sectional views or longitudinally sectional views illustrating the lower end portions of still further embodiments of the gas sparger for use in the method of the present invention;

FIGS. 16, 19 and 21 are views showing the sections taken along the line XVI—XVI in FIG. 15, the line XIX—XIX in FIG. 18 and the line XXI—XXI in FIG. 20, respectively;

DESCRIPTION OF THE PREFERRED EMBODIMENTS

Figure 1:
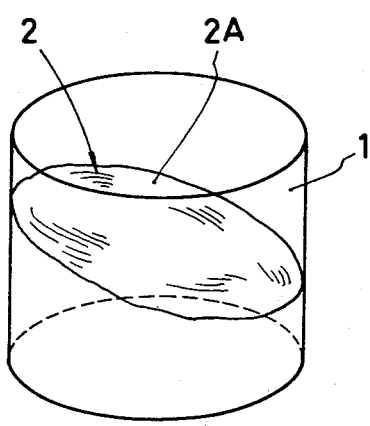
FIGS. 1-A, 1-B, 2-A and 2-B are diagrams illustrating conceptually sloshing of the level of a liquid in a gas bubbling tower.
Figure 1:
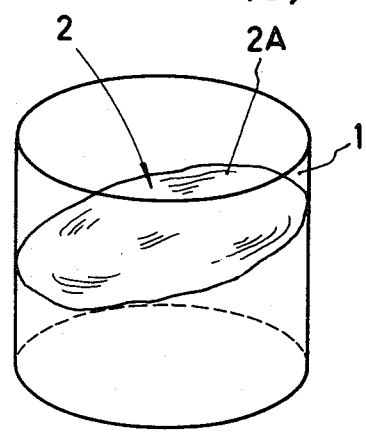
Figure 2:
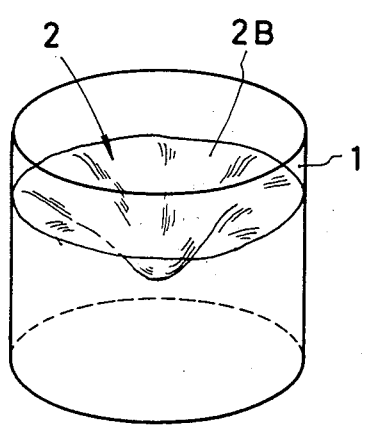
Figure 2:
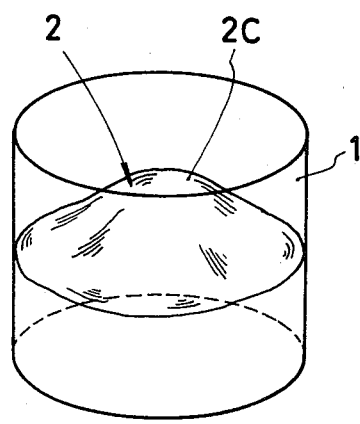
Figure 3:
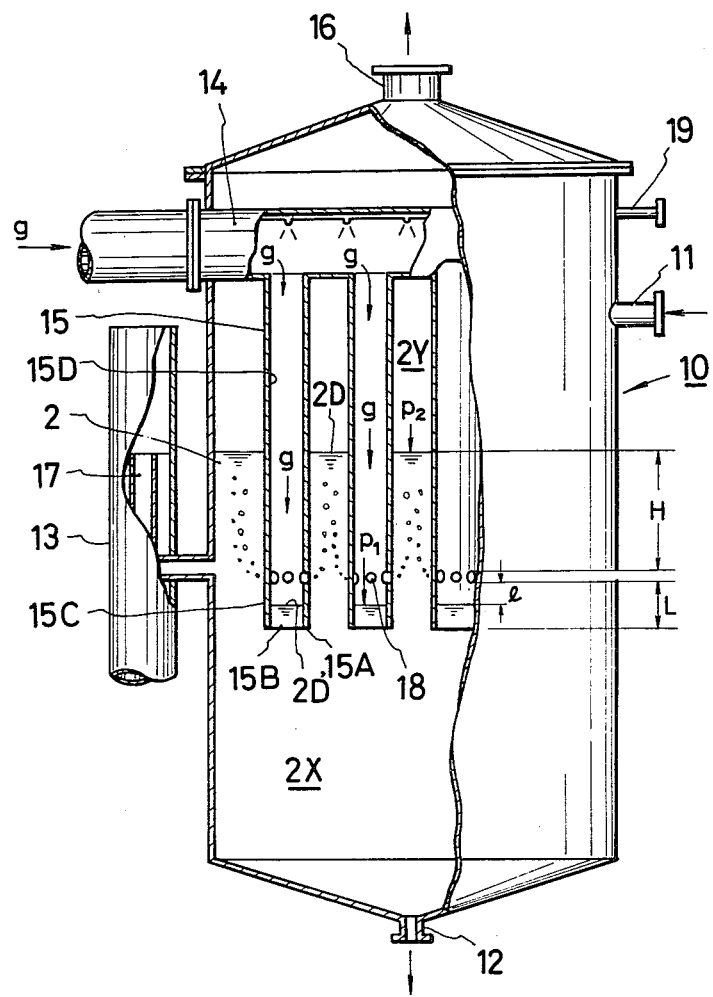
FIG. 3 is a partially cut-out view illustrating the longitudinal section of a typical embodiment of a gas-liquid contact apparatus in which the method of the present invention is adapted.

A typical embodiment of the gas-liquid contact apparatus in which the method of the present invention is adapted is shown in FIG. 3. This apparatus comprises as main structural elements a vessel 10, liquid and reactant supply means 11, liquid discharge means 12, liquid level control means 13, gas introducing means 14, a gas sparger 15 and gas discharge means 16.

The liquid and reactant supply means 11 is attached to vessel 10 to feed liquid 2 into vessel 10. Specifically, liquid and reactant supply means 11 is a liquid and reactant supply conduit having a pump (not shown). The position of attachment of the supply means 11 to the vessel 10 is not particularly critical.

Liquid discharge means 12 is attached to vessel 10 to discharge the liquid therefrom. Since liquid 2 is present in the bottom portion of vessel 10, the discharge means 12 is disposed in the bottom portion of vessel 10. Specifically, this means 12 is a discharge conduit having a pump (not shown) disposed in the midway.

Liquid level control means 13 is disposed to keep a certain quantity of the liquid 2 in vessel 10 and maintain liquid level 2D at a certain level. Liquid level 2D is always maintained at an intermediate height of vessel 10 but is not maintained at such a level that vessel 10 is completely filled with liquid 2. Accordingly, the interior of vessel 10 is divided into lower liquid phase region 2X where the liquid is present in the continuous phase and upper gas phase region 2Y formed above liquid phase region 2X.

Any means capable of maintaining liquid level 2D at a certain level in a manner as described above and in some cases, controlling the liquid level within a certain range of height can be used as liquid level control means 13. For example, overflow pipe 17 as shown in FIG. 3 can be used. In the embodiment of FIG. 3, overflow pipe 17 is attached to the side portion of the vessel 10.

The gas introducing means 14 is disposed to introduce into vessel 10 gas g to be contacted with liquid 2. Typically, means 14 is composed of a thick pipe or duct or the like.

Gas sparger 15 is a tubular member attached to gas introducing means 14 to divide the stream of gas g introduced into said means 14 and guide gas g to the liquid phase region 2X. Said tubular member comprises at least one tube, preferably at least two tubes, and the tubular member extends from gas introducing means 14 substantially vertically into liquid phase region 2X. Bottom end 15A of gas sparger 15 has an open bottom end 15B opened downwardly in liquid phase region 2X.

Figure 7:
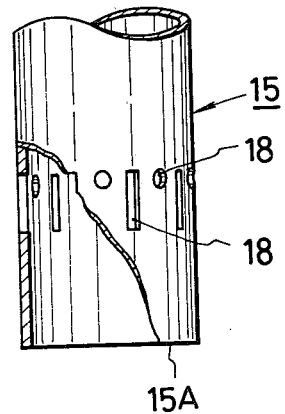

Openings 18 are formed in side wall 15C of sparger 15; they are located between liquid level 2D and bottom end 15A of said sparger. By the term "openings 18" it is meant holes or ports for communicating interior 15D of sparger 15 with the liquid phase region 2X. The configuration of such openings is not particularly critical. Said openings may be diamond-shaped, circular, square, rectangular, triangular, trapezium, trapezoidal, oval, pentagonal, hexagonal, octagonal, noinagonal, or the like (see, for example, FIGS. 4–7 which illustrate the lower portion of gas spargers). In the embodiment shown in FIG. 5, the lower end portion of the gas sparger 15 has a hood-like shape, and in the embodiment shown in FIG. 7, two kinds of the openings are formed.

It is preferred that the total area S of the openings 18 be 0.01 to 2 times, especially 0.1 to 1 time, the cross-sectional area $S_1$ of the sparger 15 at the point where the openings 18 are formed.

It is preferred that each opening 18 in the side wall of the sparger 15 be 5 to 80 mm in equivalent diameter.

The equivalent diameter of a pipe, tube, tubular member or an opening or port is four times the hydraulic radius thereof, the hydraulic radius is obtained as the ratio of the flow area to the wetted perimeter. (See pages 104–105 of Donal Q. Kern, "Process Heat Transfer", McGraw-Hill Book Company, Inc., New York, New York, 1950). Perry's Chemical Engineer's Handbook (4th Ed), McGraw Hill Book Company, 1963, Table 5–10, page 5–20, illustrates the method for calculating hydraulic radius for various cross-sections. Said pages 104–105 of Kern's aforesaid "Process Heat Transfer" teach that the hydraulic radius of an annulus is the radius of a pipe equivalent to the annulus cross-section—a similar teaching occurs on said page 5–20 of Perry's Handbook, along with a statement that hydraulic radius, $R_H$, is calculated by the formula:

$$R_H = \text{(area of stream cross-section/wetted perimeter.}$$

While the process of this invention is operable with only one opening 18 in each gas sparger 15, it is preferred to have at least 2 or 3 openings 18 in each gas sparger or tubular member 15.

It is also preferred, when using a sparger 15 with a plurality of openings 18 therein to have the distance between the centers of any two adjacent openings 18 greater than the equivalent diameter of the larger of said two adjacent openings.

It is also preferred to have the internal equivalent diameter of sparger 15 within a range of about 20–300 mm.

It is important that the distance L (see, for example, FIGS. 3, 4 and 7) between the bottom (i.e., lowest) portion of any of openings 18 and bottom end 15A of sparger 15 be at least 50 mm. Preferably, said distance L basic embodiment. These modifications will now be described.

Figure 8:
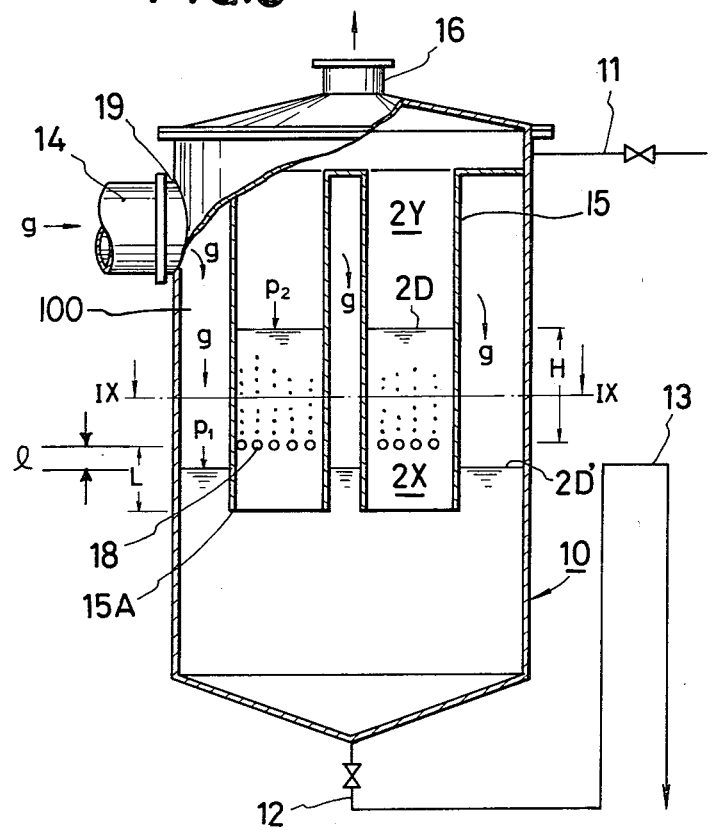
FIG. 8 is a partially cut-out view showing the longitudinal section of another embodiment of the gas-liquid contact apparatus in which the method of the present invention is adapted.
Figure 9:
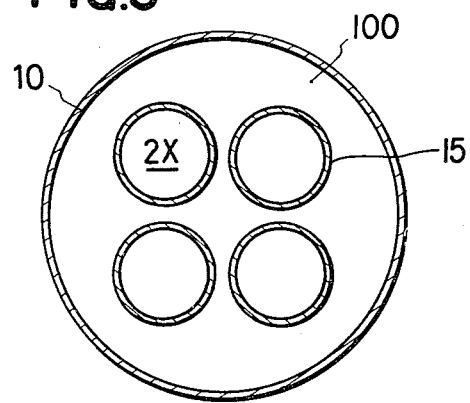
FIG. 9 is a view showing the section taken along the line IX—IX in FIG. 8.

FIG. 8 is a view illustrating another embodiment of the gas-liquid contact apparatus in which the method of the present invention is adapted and FIG. 9 is a diagram illustrating the section taken along the line IX-IX of FIG. 8. In this embodiment, gas sparger 100 is integrated with the gas introducing means 14, and a liquid phase region 2X defined by tubular member 15 is present in tubular member 15 subsequent to the gas introducing means 14. Accordingly, a gas g is introduced into vessel 10 from gas introducing means 14 and the gas g is concentratedly intruded into the region 2X of tubular member 15 via opening 18 in the lower portion of tubular member 15 around the periphery thereof, and gas g, after being introduced into region 2X is allowed to rise upward therein in the form of bubbles. That is to say, the embodiment of FIGS. 8 and 9 is a gas sparging method comprising introducing a gas into a vessel into which a tubular member extends, the tubular member having (a) a side wall having a single peripheral row of openings, and (b) an open bottom end, said tubular member extending into a liquid contained in the vessel and having a liquid level; the openings in said side wall being below the liquid level, to bring down the level of the liquid surrounding the tubular member to a position below the openings in said side wall but above the open bottom end, the gas being dispersed in the liquid in the tubular member only through the openings in the side wall of the tubular member and without producing sloshing, the distance l between the openings on the side wall of the tubular member and the liquid level in the vessel surrounding the tubular member being in the range represented by the formula:

$$10 \text{ mm} < l < (L-10) \text{ mm}$$

where L stands for the distance between the openings in the side wall of the tubular member and the open bottom end of the tubular member, which is at least 50 mm.

The referential numerals and symbols in FIGS. 8 and 9 indicate the same elements and members as in FIG. 3, except that the sparger (which is the area surrounding the tubular member 15) is designated 100.

Figure 24:
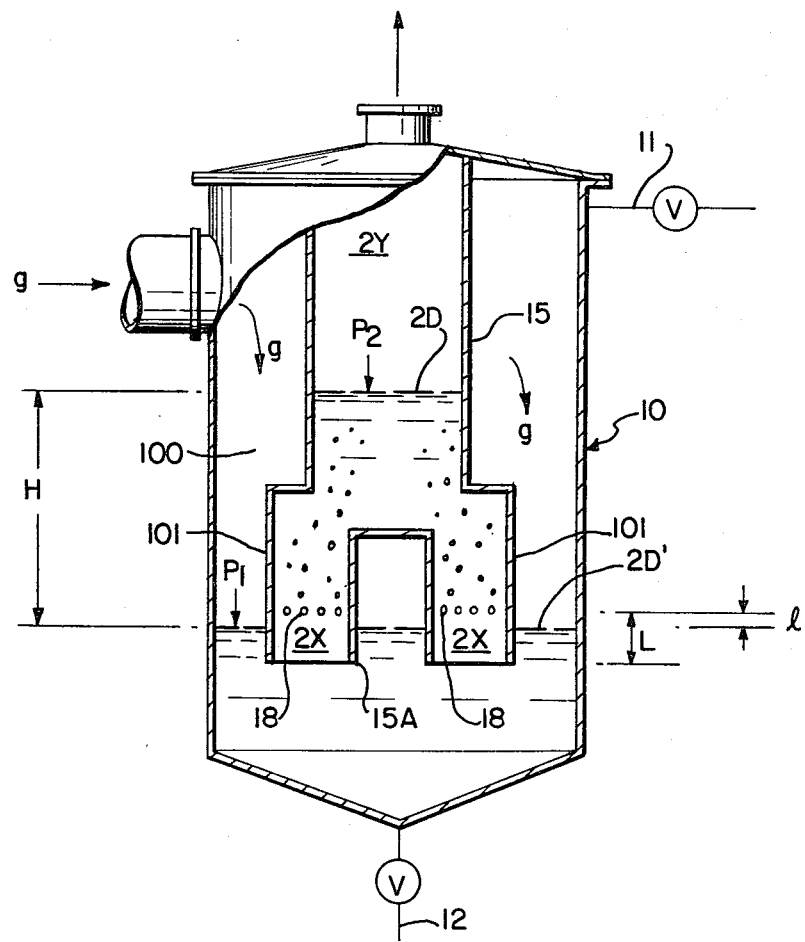
FIG. 24 is a partially cut-out view showing the longitudinal section of another embodiment of the gas-liquid contact apparatus in which the method of the present invention is adapted.

FIG. 24 is a view illustrating another embodiment of the gas-liquid contact apparatus in which the method of the present invention is adapted. In this embodiment, tubular member 15 is divided into a plurality of branches 101. That is to say, the embodiment of FIG. 24 is an embodiment of FIGS. 8 and 9 in which tubular member 15 is divided into a plurality of branches 101.

The referential numerals and symbols in FIG. 24 indicate the same elements and members as in FIG. 8, except for the newly added plurality of branches 101.

Figure 10:
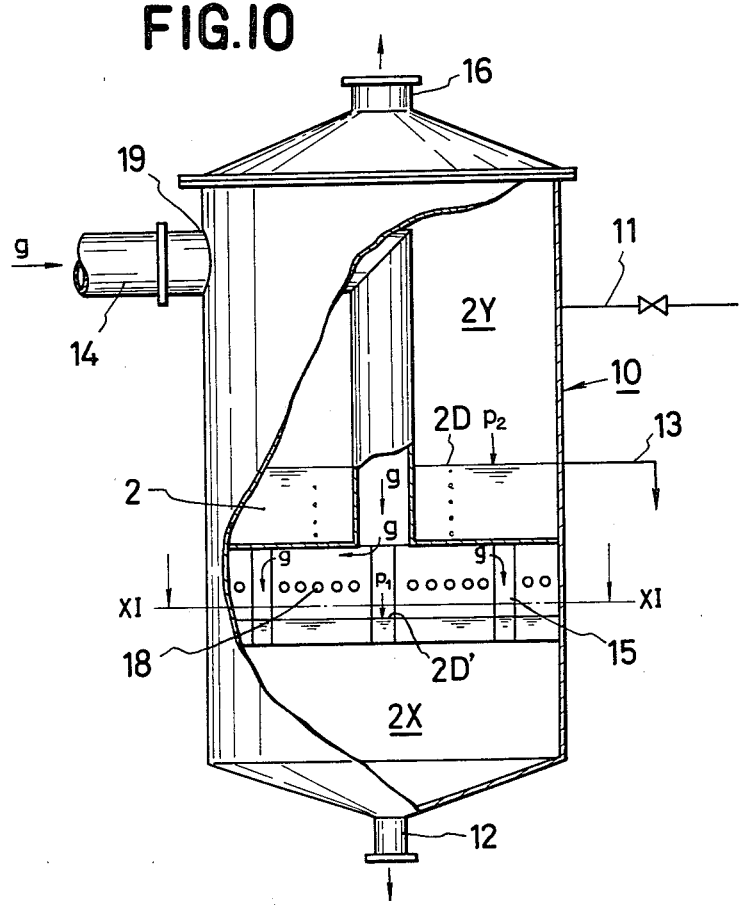
FIG. 10 is a partially cut-out view showing the longitudinal section of still another embodiment of the gas-liquid contact apparatus in which the method of the present invention is adapted.
Figure 11:
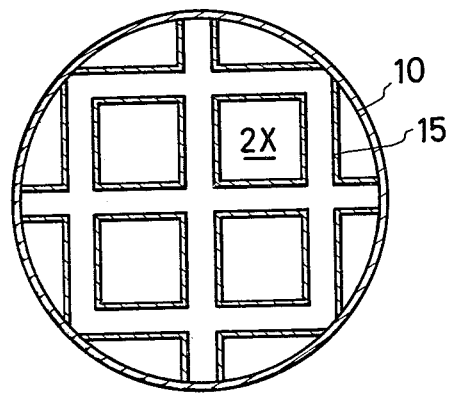
FIG. 11 is a view showing the section taken along the line XI—XI in FIG. 10.

FIG. 10 is a diagram illustrating the longitudinal section of still another embodiment of the gas-liquid contact apparatus which is adapted for use in the method of the present invention, and FIG. 11 is a view illustrating the section taken along the line XI—XI in FIG. 10.

In the embodiment shown in FIG. 10, the sparger 15 is branched and the branches communicate with one another. Namely, sparger 15 is designed and constructed so that bubbles jetted from the openings on the side wall are contacted uniformly with the liquid at respective parts in the interior of vessel 10.

In addition to the manner of connecting the branches of sparger 15 shown in FIG. 10, there may be adopted an arrangement in which the branches of sparger 15 are disposed in the form of a plurality of concentric rings.

Any of optional shapes can be adopted for openings 18 on the side wall of sparger 15 irrespective of the sectional shape of said sparger. For example, openings 18 can be diamond-shaped, circular, square, triangular, trapezium, trapezoidal, oval, pentagonal, hexagonal, octagonal, noinagonal, or the like.

In FIGS. 10 and 11, the referential numerals and symbols indicate the same members and elements in FIG. 3.

One of the specific intended objects of the method of the present invention is to prevent adhesion and deposition of scale on sparging of the gas.

Figure 12:
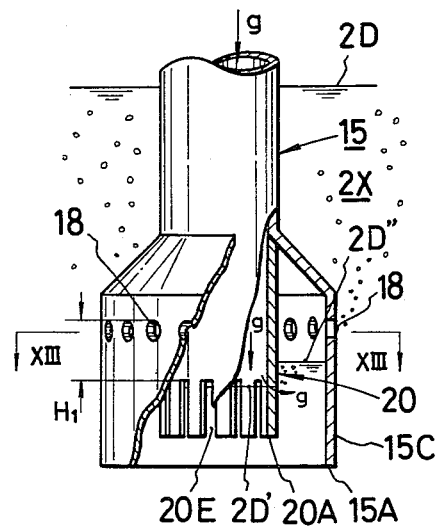
FIG. 12 is a partiallly cut-out view showing the longitudinal section of the lower end portion of still another embodiment of the gas sparger for use in the method of the present invention in which formation of scales is effectively controlled.
Figure 13:
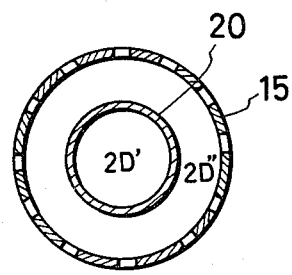
FIG. 13 is a view showing the section taken along the line XIII—XIII in FIG. 12.

In the present invention, in order to attain this object effectively, the lower end portion of the gas sparger 15 may be designed to have a specific structure. A typical embodiment of this arrangement is illustrated in FIGS. 12 and 13. FIG. 12 is a partially cut-out view showing the longitudinal section of the lower end portion of the gas sparger 15, and FIG. 13 is a view showing the section taken along the line XIII—XIII in FIG. 12. As seen from FIGS. 12 and 13, tubular member 15 of the gas sparger 15 has a nozzle 20 inside thereof and the upper end of the nozzle 20 is connected with the tubular member of sparger 15. The bottom end 15A of the tubular member extends downwardly beyond the bottom end 20A of the nozzle 20, and side wall openings 18 are formed in the midway of side wall 15C of sparger 15. Further, notches 20E are formed below the positions of openings 18 on side wall 15C of sparger 15. The liquid level 2D' in the nozzle 20 is maintained at a position above the bottom end 15A but below the side wall openings 18.

In this embodiment, a gas g to be treated is introduced into nozzle 20 and dispersed in the liquid phase in the form of fine bubbles through the notches 20E on the bottom end of the nozzle 20 and side wall openings 18 in tubular member 15. Finally, the gas bubbles are allowed to rise up in the liquid phase by buoyancy and are introduced into gas phase region 2Y. Since side wall openings 18 in tubular member 15 are located above the notches 20E of the nozzle 20, if the area of side wall openings 18 in tubular member 18 is appropriately set according to the quantity of the gas, liquid level 2D" of the region surrounded by side wall 15C of tubular member 18 and nozzle 20 can always be maintained at a level higher than the upper ends of notches 20E. If such arrangement is adopted, when the gas introduced in nozzle 20 passes through the notches 20E, it entrains liquid and a turbulent gas-liquid mixed phase is formed, and this mixed phase passes through side wall openings 18 of the tubular member 15. Therefore, even in case of a combination of gas and liquid which will readily cause precipitation of solids by the contact, the precipitated solids are washed away between nozzle 20 and the side wall 15C of tubular member 15 and do not adhere to nozzle 20.

Liquid level 2D" is influenced by factors including the height and size of side wall openings 18. These factors are determined so that liquid level 2D" is maintained between bottom end 20A of nozzle 20 and the position of side wall openings 18. In general, if liquid level 2D" is maintained at a lower level, generation of waves on the liquid level 2D" can be diminished but in this case, the scale deposition-preventing effect is relatively reduced. Accordingly, in order to control deposition of scale, the liquid level 2D" is maintained at a should be at least 50 mm and not more than about 500 mm; however, the process of the instant invention is operable when said distance L is greater than 500 mm. This upper limitation (L being not greater than about 500 mm) is a practical limitation included for convenience and to provide for very efficient operation rather than a critical limitation, because, as noted supra, the process can be operated when L is greater than 500 mm. In this respect, it is noted that, while all of openings 18 are positioned in a single row around the periphery of sparger or tubular member 15, they need not all be the same size nor the same shape; see FIG. 7.

Further, when distance L is within the abovementioned ranges (i.e., at least 50 mm or 50–500 mm), distance l, which is the distance between the lowest part or portion of any of openings 18 in tubular member 15 and liquid level 2D' on the gas inlet side of tubular member or sparger 15 is represented by the following formula:

$$10 \text{ mm} < L < (L-10) \text{ mm}.$$

In order to increase the gas-liquid contact efficiency, it is preferred to form openings 18 at a position where the liquid depth H from the liquid level 2D is at least 5 cm; see FIGS. 3 and 8.

Figure 5:
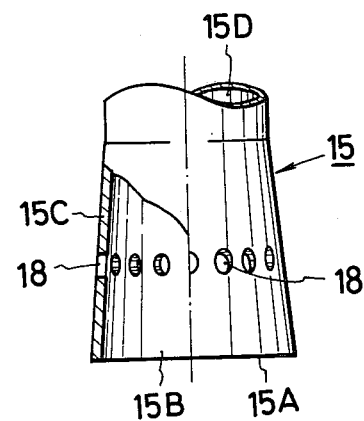
FIGS. 5 to 7 are partially cut-out views showing the longitudinal sections of lower end portions of further embodiments of said gas sparger.
Figure 6:
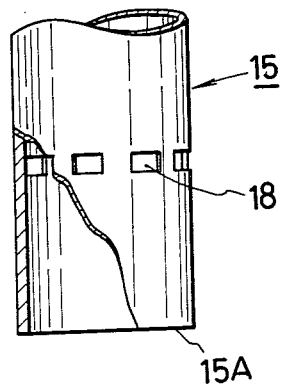

In the apparatus shown in FIG. 3, the lower end portion of the sparger 15 may have a hood-like shape as shown in FIG. 5 or a reverse shape, namely an upwardly narrowed shape.

In the present invention, a liquid jetting spray 19 may be disposed in the introducing means 14 or on the gas introduction (gas feed) side of sparger 15 to form a wet wall on said gas introduction side, using a liquid or solvent which can be water or another solvent or liquid including liquid 2 (i.e., the scrubbing liquor).

In a typical embodiment of the gas-liquid contact method of the present invention, utilizing apparatus which has the above-mentioned structure, the gas-liquid contact is carried out according to the following procedures:

As the gas to be treated, there can be mentioned an exhaust gas containing $SO_2$, nitrogen oxides ($NO_x$) and ammonia, and a hydrogen chloride- or hydrogen sulfide-containing exhaust gas. As liquid 2 (scrubbing liquor) to be contacted with the gas, there can be mentioned a slurry containing a calcium compound such as $CaCO_3$, $Ca(OH)_2$ or the like.

Referring to FIG. 3 which illustrates an embodiment of the instant invention, a liquid such as mentioned above is guided through liquid supply means 11 and introduced into vessel 10. If the liquid is not discharged from the liquid discharge means 12 at a rate equal to or higher than the liquid feed rate, the liquid is gradually accumulated in the vessel 10, and the liquid level 2D is maintained at a certain level by liquid level control means 13.

After the above-mentioned state has been attained in vessel 10, a gas to be contacted with the liquid is fed by the gas introducing means 14, and the gas is dispersed by gas sparger 15 through openings 18 and guided to the liquid phase region 2X. Since the gas is fed in a compressed state (being compressed by, for example, a blower (not shown)), liquid level 2D' maintained in the gas sparger 15 is lowered upon receipt of the gas feed under a pressure designated $P_1$. When liquid level 2D' in sparger 15 is thus lowered below openings 18 on the side wall of the gas sparger 15, the gas is jetted into the liquid of the liquid phase region 2X in a horizontal direction through openings 18 in the side wall of sparger 15. At this point, the gas is finely divided into bubbles and dispersed in the liquid in the horizontal direction. The bubbles are allowed to rise up and they naturally are raised up toward the liquid level. During this rising movement, mass transfer is caused in the gas-liquid interface, and a specific component contained in the gas is absorbed in the liquid and the gas-liquid contact can be performed effectively. If a wet wall is formed on the inner wall surface of the gas sparger by using spray 19, the effect of preventing deposition of scale is further enhanced.

In the present invention, gas feed pressure $P_1$, the number of gas spargers 15, the average liquid height H from the liquid level 2D to the position of the openings 18 on the side wall, the height L from said position of the openings 18 to the bottom end 15A, the configuration, size and number of the openings 18 on the side wall, the area $S_1$ of opening 15B and the pressure $P_2$ of the gas phase region 2Y are determined so that the liquid level 2D', which is lowered in gas sparger 15 by the compressive force of the gas is maintained at a level between the lowermost point of the openings 18 on the side wall and bottom end 15A of gas sparger 15. By adoption of this arrangement, in the present invention, the force of rising the gas in the liquid is limited to the buoyancy of the gas per se, and therefore, a longer time can be taken for the gas-liquid contact, and even if the gas feed pressure $P_1$ is changed within a certain range, by automatically changing the liquid level 2D' in gas sparger 15 within a certain range, factors or influences causing changes of the liquid level 2D can be moderated. Further, it is possible to allow the gas to pass through openings 18 on the side wall at a high speed. Accordingly, the gas-liquid contact can be performed with a high efficiency, and the deposition of scale causing cloggings of openings 18 can be effectively prevented in the vicinity of the openings. Especially, waving, namely, sloshing of the liquid level 2D can be effectively prevented according to the method of the present invention.

In the present invention, there is observed the following peculiar phenomenon:

When the gas is bubbled out only from openings 18 on the side wall of sparger 15 before a certain superficial gas velocity is attained in sparger 15, it is observed that a certain variation of the liquid level is caused by sloshing resulting from increase of the superficial gas velocity in sparger 15, but when the superficial gas velocity in sparger 15 exceeds a certain level, sloshing is diminished and the range of the variation of the liquid level 2D with increase of the superficial gas velocity in sparger 15 is remarkably narrowed. The range of such superficial gas velocity in sparger 15 that does not cause a great variation of the liquid level 2D is regarded as a stable operation range. It has been found that this operation range is realized depending on the positional relationship between openings 18 in side wall 15C and bottom end 15A of sparger 15.

According to the method of the present invention, the gas-liquid contact treatment capacity can be increased to a level of, for example, 300 to 5000 $Nm^3/m^2 \cdot hr$.

The typical gas-liquid contact apparatus in which the method of the present invention is adopted has been illustrated. As will be apparent to those skilled in the art, various modifications may be made to the foregoing relatively high level, though some waves are generated on the liquid level 2D''.

It is also effective for preventing deposition of scale to increase the total area $S_2$ of liquid level 2D''. This area $S_2$ is 1 to 10 times, preferably 2 to 5 times, the total area of side wall openings 18.

In FIGS. 12 and 13 illustrating a typical embodiment of the lower end portion of the gas sparger useful in the process of the instant invention, the referential numerals and symbols indicate the same members and elements as in the preceding Figures.

Further embodiments of the lower end portion of the sparger useful in the process or method of the instant invention will now be described by reference to FIGS. 14 to 21, in which reference numerals and symbols indicate the same members and elements as in the preceding Figures.

Figure 14:
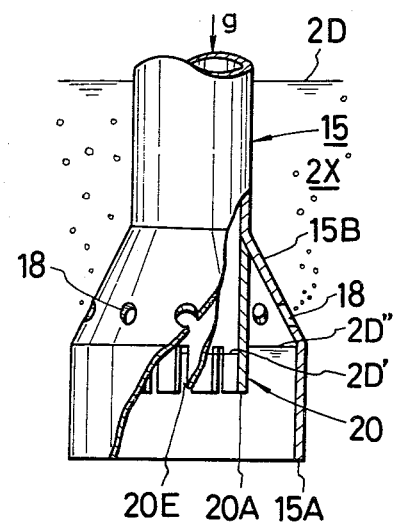

In an embodiment illustrated in FIG. 14, side wall openings 18 are formed on the hood-like portion 15B of the tubular member.

Figure 15:
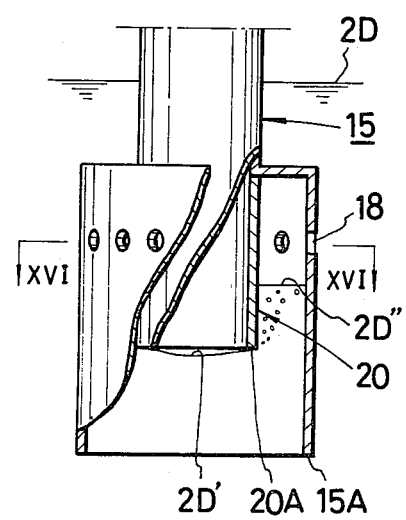
Figure 16:
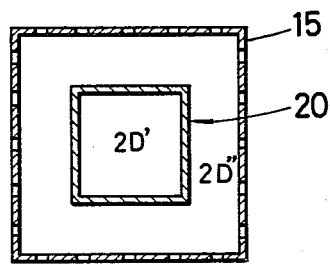
Figure 17:
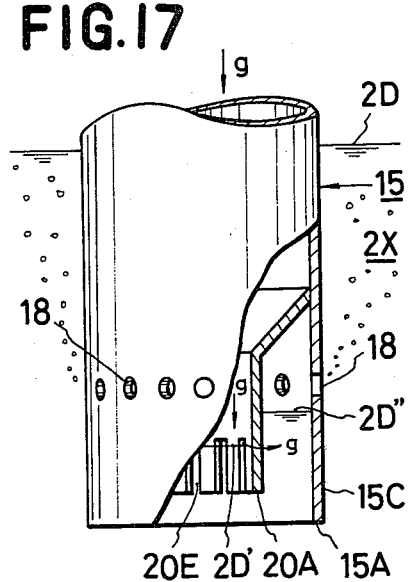

In an embodiment shown in FIG. 15, notches 20E as shown in FIGS. 12 and 14 are not formed, and the section of the lower end portion of the sparger 15 with respect to the horizontal direction has a square shape as shown in FIG. 16.

Figure 18:
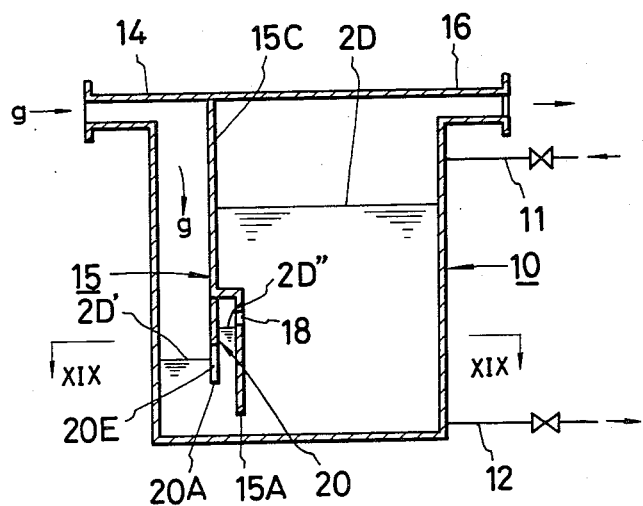

FIGS. 18 and 20 illustrate embodiments in which a nozzle 20 is attached to the side wall 15C of a long gas sparger 15, and FIGS. 19 and 21 show the sections taken along the line XIX—XIX in FIG. 18 and the line XXI—XXI in FIG. 20, respectively. In the embodiment shown in FIG. 18, a part of the side wall of the gas sparger 15 is constituted by the inner side wall of the vessel 10.

The present invention will now be further described by reference to the following examples that by no means limit the scope of the invention.

EXAMPLE 1

Figure 4:
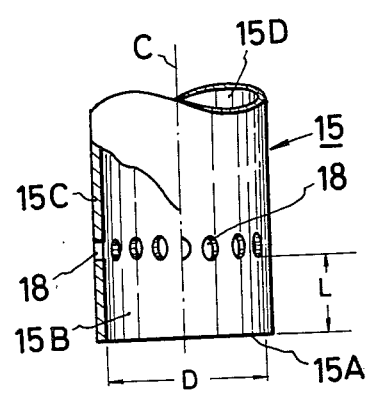
FIG. 4 is a partially cut-out view showing the longitudinal section of the lower end portion of a gas sparger in the apparatus shown in FIG. 3.

By using a gas sparger 15 of the present invention shown in FIG. 4 and a known gas sparger having only an open bottom end and not being provided with side wall openings, the comparative experiments were carried out under the following conditions. The gas spargers were arranged as shown in FIG. 3.

The diameter of the gas sparger was 100 mm, and each of openings 18 on the side wall of sparger 15 was 20 mm in diameter and the distance L between the side wall openings 18 and the bottom end 15A was 200 mm. The gas spargers 15 were arranged at intervals of about 300 mm in a vessel having a length of 3000 mm. In case of the sparger provided with the side wall openings, the liquid level was maintained at a level H 100 mm above the side wall openings, and in case of the conventional sparger, the liquid level was maintained at a level 100 mm above the bottom end 15A, when the gas was not introduced. In this state, the gas was introduced.

Figure 22:
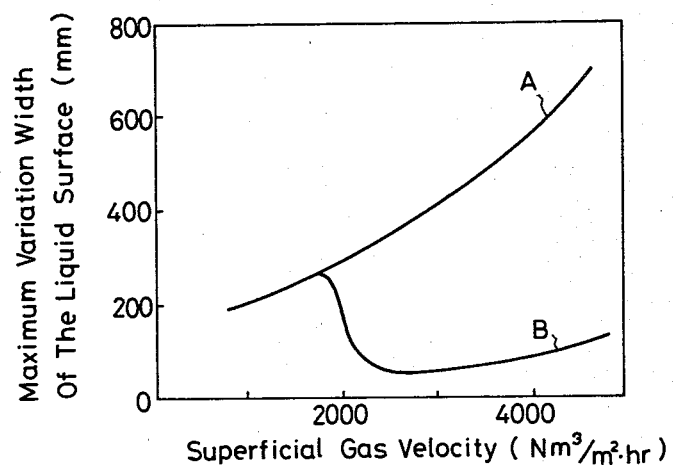
FIGS. 22 and 23 are graphs illustrating experimental results of the method of the present invention.

In case of the gas sparger without side wall openings 18, with increase of the quantity of the gas (the superficial gas velocity in a column—the column being the tubular member constituting the sparger), changes of the liquid surface, namely sloshing became vigorous and the operation became difficult. On the other hand, in case of the gas sparger provided with side wall openings 18, when the quantity of the gas exceeded a certain level, changes of the liquid level were diminished, and even if the quantity of the gas was further increased, no periodical movement or sloshing of the liquid was observed. FIG. 22 illustrates this phenomenon quantatively, in which the abscissa indicates the superficial gas velocity and the ordinate indicates the width of changes of the liquid surface. Curve A shows the results obtained in case of the comparative sparger and curve B shows the results obtained in case of the sparger of the present invention. As will be apparent from the results shown in FIG. 22, when the gas sparger of the present invention having side wall openings is employed, the gas can be treated effectively even if the quantity of the gas is large.

When the experiments were carried out by using the gas sparging apparatus of the type shown in FIG. 8, it was confirmed that the results obtained were quite similar to those obtained by the experiments conducted when using the apparatus shown in FIG. 3.

In the foregoing experiments using the gas sparger of the present invention, the diameters of bubbles formed by the jetting dispersion of the gas were measured. It was found that substantially all of the bubbles had a diameter of 3 to 5 mm and that the liquid containing these bubbles was violently fluidized by the rising bubbles. Thus, it has been confirmed that according to the present invention, gas-liquid contact can be accomplished with a very high efficiency.

As will be apparent from the foregoing illustration, when the gas-liquid contact apparatus utilizing the method of the present invention is used, the operation can be performed very stably and the treatment efficiency is scores of times higher than the treatment efficiency attainable by the conventional gas bubbling tower of the continuous liquid phase type where a gas rises up in the continuous phase of a liquid while having contact therewith. Further, since the bottom end of the gas sparger is opened, even if the liquid is a slurry, clogging is not caused at all, and since the gas is bubbled out of the openings on the side wall, gas bubbles are expanded in a very broad region. Accordingly, spacing between the gas spargers can be greatly increased, making it practical to simplify the structure.

EXAMPLE 2

A vessel having a diameter of 3 m was filled with water, and the gas sparging experiment was carried out by using a gas-liquid contact apparatus as shown in FIG. 12 and the state of generation of sloshing was examined. The main dimensions of the apparatus used were as follows:

Size of side wall openings: 20 mm in diameter
Number of side wall openings: 16
Size of notch 20E: 20 mm in width and 150 mm in length
Number of notches: 9
Size of bottom of tubular member of gas sparger 15: 200 mm in diameter (circular)
Distance $H_1$ between top end of notch 20E and top end of side wall opening 18 in vertical direction: 40 mm
Distance between bottom end 15A and bottom end 20A of nozzle 20 in vertical direction: 50 mm
Distance between upper end of nozzle 20 and bottom end 20A of nozzle 20 in vertical direction: 250 mm
Size of nozzle 20: 100 mm in diameter Gas spargers 15 were arranged in a pattern of equilateral triangles of pitches (distance between centers of adjacent spargers) of 350 mm. When the gas was not introduced, the liquid level was set at a position 150 mm above the upper end of the openings 18 of the tubular member (corresponding to H).

For comparison, gas spargers 15 having the lower end portion notched but being free of side wall openings 18, which were 100 mm in diameter, were arranged in a pattern of squares of pitches of 250 mm in the above-mentioned vessel having a diameter of 3 m. When the gas was not introduced, the liquid level was set at a position 150 mm above the upper end of the notch.

The gas sparging experiments were carried out under the same conditions by employing the foregoing two equipments.

Figure 23:
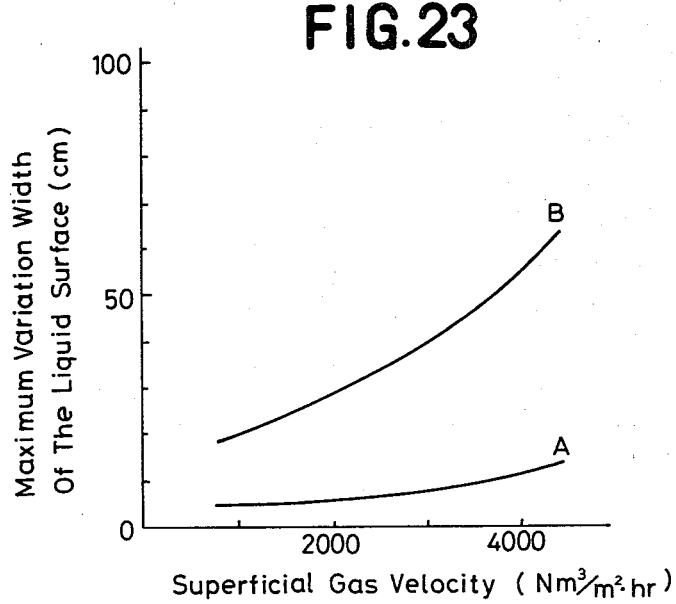

The results obtained are shown in FIG. 23, which is a graph illustrating the relation between the superficial gas velocity in a sparger or a column ($Nm^3/m^2 \cdot hr$) and the maximum variation width (cm) of the liquid surface. In FIG. 23, curve A shows the results obtained in the run using the sparger of the present invention and curve B shows the results obtained in the comparative run. From these experimental results, it will readily be understood that when the gas-liquid contact apparatus utilizing the method of the present invention is employed, the gas-liquid contact treatment can be accomplished in a very stable manner with a greatly reduced variation width of the liquid surface in a considerably broad region of operation conditions (i.e., in a broad region of the quantity of the gas being treated per unit of time).

We claim:

1. A gas sparging method comprising introducing an exhaust gas containing $SO_2$ through a tubular member extend into a vessel, the tubular member having (a) a side wall having only a single peripheral row of openings and (b) an open bottom end, said tubular member extending into a liquid containing a calcium compound, said liquid being contained in the vessel and having a liquid level, the openings in said side wall being below the liquid level, to bring down the level of the liquid in the tubular member to a position below the openings in said side wall, but above the open bottom end of the tubular member, the gas being dispersed in the liquid in the vessel surrounding the tubular member only through the openings in the side wall of the tubular member and without producing sloshing, the distance l between the openings in the side wall of the tubular member and the liquid level in the tubular member below said openings being in a range represented by the formula:

$$10 \text{ mm} < l < (L-10) \text{ mm}$$

wherein L is the distance between the openings in the side wall of the tubular member and the open bottom end of the tubular member and is at least 50 mm, the ratio of the total area of said openings to the cross-sectional area of the tubular member at the position of the openings being 0.01 to 2 and the internal equivalent diameter of the tubular member being 20 to 300 mm.

2. The method of claim 1 wherein a liquid is caused to flow on the inner surface of the tubular member.

3. The method of claim 1 wherein the distance L is 50 to 500 mm.

4. The method of claim 1 wherein each of the openings in the side wall of the tubular member is 5 to 80 mm in equivalent diameter.

5. The method of claim 1 wherein the tubular member is divided into a plurality of branches.

6. The method of claim 1 wherein a nozzle having an upper end and an open bottom end is positioned inside the tubular member with: (i) the upper end of the nozzle communicating with the tubular member above the openings in the side wall of the tubular member, and (ii) the bottom end of the nozzle being positioned below the openings in the side wall of the tubular member so that liquid between the tubular member and the nozzle is maintained at a level below the openings in the side wall of the tubular member and above the bottom end of the nozzle.

7. A gas sparging method comprising introducing an exhaust gas containing $SO_2$ into a vessel into which a tubular member extends, the tubular member having (a) a side wall having only a single peripheral row of openings and (b) an open bottom end, said tubular member extending into a liquid containing a calcium compound, said liquid being contained in the vessel and having a liquid level, the openings in said side wall being below the liquid level, to bring down the level of the liquid in the vessel surrounding the tubular member to a position below the openings in said side wall, but above the open bottom end of the tubular member, the gas being dispersed into the liquid in the tubular member only through the openings in the side wall of the tubular member and without producing sloshing, the distance l between the openings in the side wall of the tubular member and the liquid level in the vessel surrounding the tubular member below said openings being in the range represented by the formula:

$$10 \text{ mm} < l < (L-10) \text{ mm}$$

wherein L is the distance between the openings in the side wall of the tubular member and the open bottom end of the tubular member and is at least 50 mm, the ratio of the total area of said openings to the cross-sectional area of the tubular member at the position of the openings being 0.01 to 2 and the internal equivalent diameter of the tubular member being 20 to 300 mm.

8. The method of claim 7 wherein a liquid is caused to flow on the outer surface of the tubular member.

9. The method of claim 7 wherein the distance L is 50 to 500 mm.

10. The method of claim 7 wherein each of the openings in the side wall of the tubular member is 5 to 80 mm in equivalent diameter.

11. The method of claim 7 wherein the tubular member is divided into a plurality of branches.

* * * * *